Figure 1:
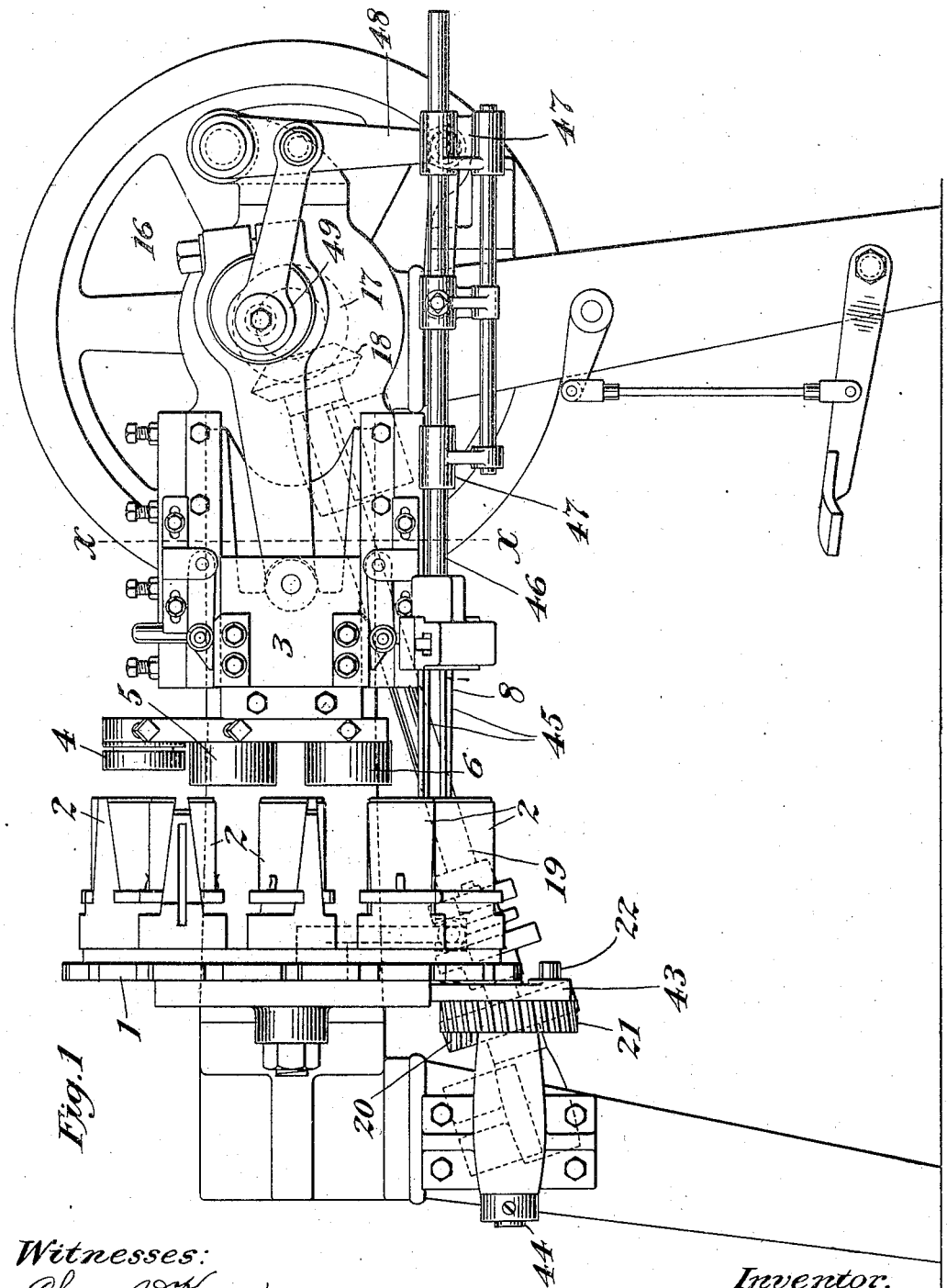

No. 788,535. PATENTED MAY 2, 1905.
H. H. HULL.
NECKING-IN MACHINE.
APPLICATION FILED JULY 2, 1903. RENEWED OCT. 3, 1904.

5 SHEETS—SHEET 3.

Witnesses:
Chas. D. King.
Annie Wiseman.

Inventor:
Herbert H. Hull
By his Attorneys
Beeken & Spaulding

No. 788,535. PATENTED MAY 2, 1905.
H. H. HULL.
NECKING-IN MACHINE.
APPLICATION FILED JULY 2, 1903. RENEWED OCT. 3, 1904.

5 SHEETS—SHEET 4.

Witnesses:
Chas. W. King
Annie Nissemann

Inventor:
Herbert H. Hull
By his Attorneys
Dicken & Spaulding

No. 788,535. PATENTED MAY 2, 1905.
H. H. HULL.
NECKING-IN MACHINE.
APPLICATION FILED JULY 2, 1903. RENEWED OCT. 3, 1904.

5 SHEETS—SHEET 5.

Witnesses:
Chas. D. King.
Annie Kissmann

Inventor:
Herbert H. Hull
By his Attorneys
Dicken Spaulding

No. 788,535. Patented May 2, 1905.

UNITED STATES PATENT OFFICE.

HERBERT H. HULL, OF CLEVELAND, OHIO, ASSIGNOR TO HULL KEY CAN COMPANY, OF CLEVELAND, OHIO, A CORPORATION OF NEW JERSEY.

NECKING-IN MACHINE.

SPECIFICATION forming part of Letters Patent No. 788,535, dated May 2, 1905.

Application filed July 2, 1903. Renewed October 3, 1904. Serial No. 226,933.

*To all whom it may concern:*

Be it known that I, HERBERT H. HULL, a citizen of the United States of America, and a resident of Cleveland, county of Cuyahoga, State of Ohio, have invented certain new and useful Improvements in Necking-in Machines, of which the following is a specification.

My invention relates to necking-in machines used in the manufacture of containing vessels, as tin cans.

Heretofore can-bodies have been fed by hand to a rotatable dial carrying a plurality of horns and acted upon by the proper tools to effect the necessary operation.

In manufacturing containing vessels, as tin cans, it is contemplated to operate the several machines necessary in the complete manufacture of a can in unison and to provide means for carrying the blanks or partially-completed products continuously from one machine to another. In the present instance the necking-in machine will receive the can-bodies as they come from the body-making machine and will act upon them in the proper manner. In so doing, however, it is found that with the present construction of necking-in machines it is not possible to act upon the can-bodies as fast as the body-making machine delivers them.

The object of my invention is therefore chiefly concerned in the production of a structure capable of operating at a very high speed and in general to improve the machine so as to make the same work efficiently. In carrying out this idea I have found that by making the horns expansible and collapsible the speed of the machine can be increased very materially. I further provide a feeding mechanism for feeding the can-bodies successively to the several horns and cause the said can-bodies to be acted upon by two punches of a special construction instead of one, as heretofore. When running the machine at a high speed, it is preferable to have a locking means for the dial in order to insure proper alinement, and I have accordingly constructed my machine with an intermittent locking mechanism.

The invention therefore consists in the foregoing features and in the hereinafter more particularly described features of construction and combination of parts.

In the accompanying drawings I have embodied my invention in a suitable form; but changes of construction may of course be made without departing from the spirit of the invention.

Figure 2:
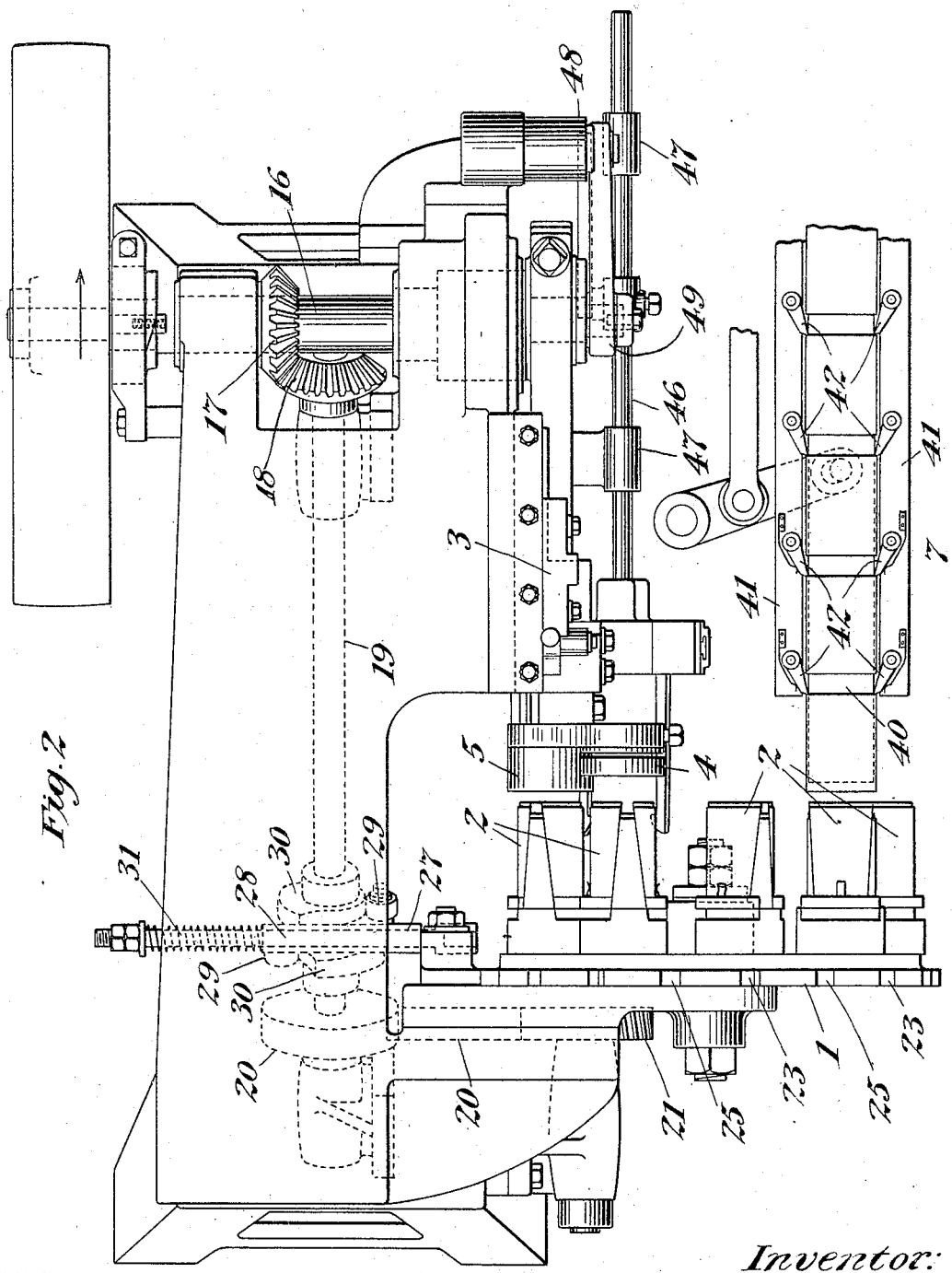
Figure 3:
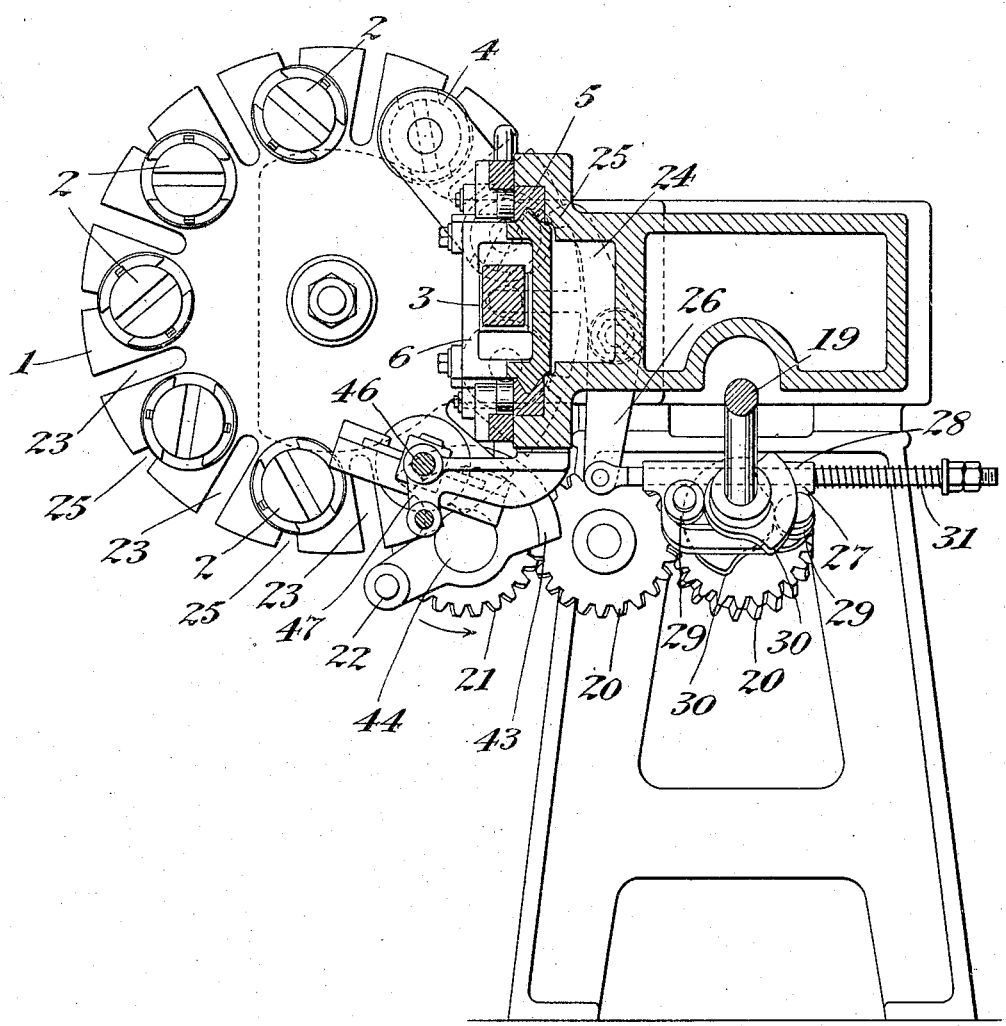
Figure 4:
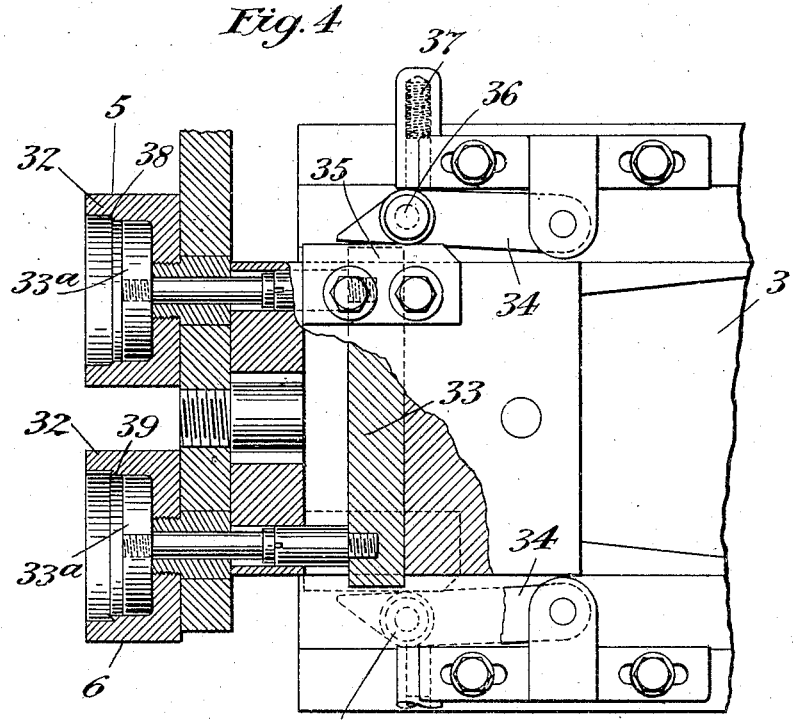
Figure 5:
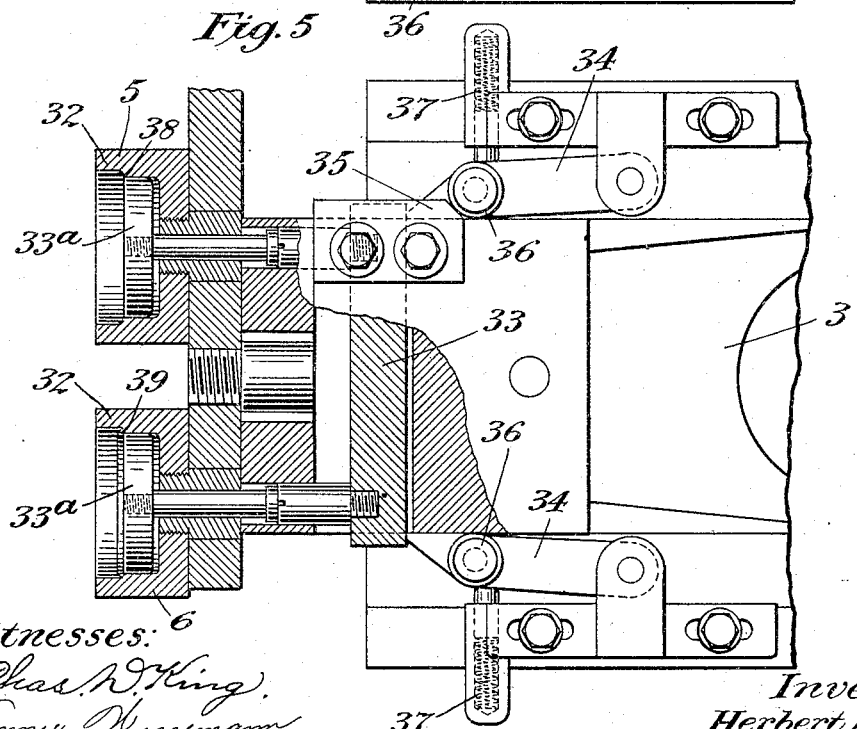
Figure 6:
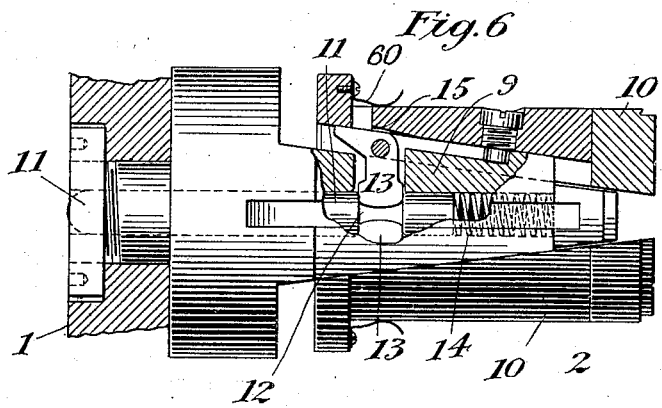
Figure 7:
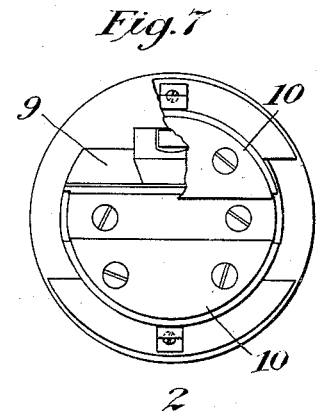
Figure 8:
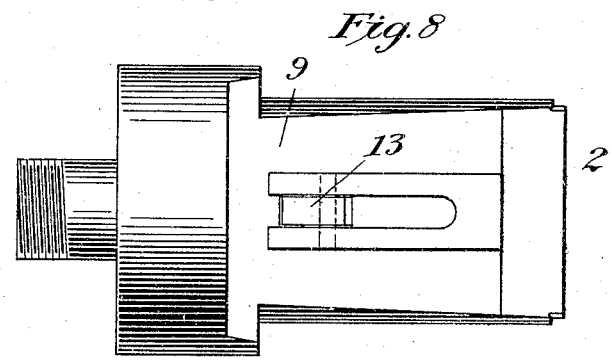
Figure 9:
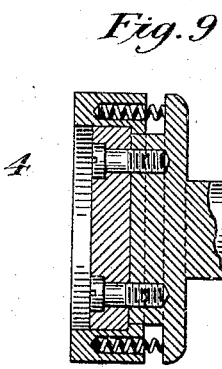
Figure 10:
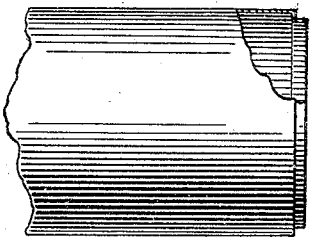

In the said drawings, Figure 1 is a side elevation of a machine embodying my invention. Fig. 2 is a plan view of the machine. Fig. 3 is a sectional view on the line *x x* of Fig. 1. Figs. 4 and 5 are detailed views of the punches carried by the reciprocating slider, partly broken in section to facilitate the illustration of the same. Fig. 6 is a detailed view of one of the horns, partly in section. Fig. 7 is an end view of Fig. 6, partly broken away. Fig. 8 is a plan view of Fig. 6 with the uppermost member of the horns removed. Fig. 9 is a sectional detailed view of the plunger carried by the slider. Fig. 10 is a view of the can-body after it has been necked in.

1 indicates a rotatable dial carrying a plurality of horns 2.

3 is a reciprocating slider carrying a plunger 4 and two punches 5 and 6.

7 denotes a feeding mechanism for automatically feeding the can-bodies to the horns, and 8 is a stripping device.

Each horn 2 is composed of a stationary tapering core portion 9, attached with its rear end to the front of the dial, and two longitudinally-movable and wedge-shaped pieces 10 on said core portion.

11 is a plunger located in the core portion 9 and provided with a groove 12, into which extends two pivoted members 13, while the spring 14 exerts a constant pressure to cause the plunger 11 to protrude at the rear of the dial, the pivoted members tending to counteract the spring when the two movable pieces 10 are in their foremost position, as shown in Fig. 6, and by resting on the other end on the pivoted members 13 prevent the spring 14 from causing the plunger 11 to protrude from the dial. When the said movable pieces 10 are in their rearmost position, the said pivoted members will move into the notches 15 on the movable pieces, and thus lock the said movable pieces in their rearmost position, and will simultaneously therewith allow the plunger 11 to protrude from the dial. When the said movable pieces are in their foremost position, the horn is collapsed, and when in their rearmost position the horn is expanded.

60 is a spring-detent on the core portion and extending over one of the movable pieces 10 to hold the bodies better in position on the said horn.

The dial is rotatable intermittently in one direction only and is conveniently operated from the power-shaft 16 through the bevel-gears 17 and 18, the inclined shaft 19, the train of gears 20 and 21, the latter of which carries a roll 22 to engage with the notches 23 on the dial to turn the same a distance.

To cause proper alinement, an intermittent locking mechanism for the dial is provided. This will preferably take the form of a pivoted lever 24, adapted to engage with the notches 25 of the dial and connected with the arm 26, attached in turn to the rod 27, carrying the sleeve 28, having a roll 29 on either side of the said rod. Mounted on the inclined shaft 19 are two cams 30, adapted to engage with the rolls 29 to move the rod 27 in opposite directions and to cause the pivoted lever to engage and disengage with the notches 25. To make the action more positive, a compressible spring 31 is mounted on the rod 27.

As previously stated, the reciprocating slider 3 carries a plunger 4 and two punches 5 and 6. The plunger and two punches could of course be mounted independently; but the present form is preferable. The plunger 4 is of any suitable construction and is for the purpose of pushing the can-bodies in position on the horns and also for the purpose of moving the movable pieces 10 into their rearmost position, which has the effect, as previously pointed out, of locking the said pieces in their rearmost position and of causing the plunger 11 to protrude from the dial.

To turn out a better article, two punches are provided instead of one, the first punch starting the curling of the edge and the second punch completing the operation. These punches are substantially identical, and one only will therefore be described.

Attached rigidly to the slider 3 is an outer member 32 of the punch.

33 is a movable piece on the slider, carrying an inner member 33ª of the punch.

34 indicates two dogs, one on each side of the slider, adapted to engage with the movable piece of the slider, so as to retard the retrograde movement of the inner member of the punch until the said slider has moved far enough to cause the cam-surfaces 35 to engage with the rolls 36 of the dogs 34, so as to lift the same out of the way of the said movable piece. The spring-seated pins 37 are for the purpose of moving the dogs quickly behind the movable pieces. By this means the punches will not pull the can-bodies off the horns when moving away from the same.

The punch 5 is provided on its outer member with a circumferential rounded ledge 38, while the punch 6 has a circumferential angular ledge 39. If different effects are desired, there could of course be a number of punches variously formed to effect the proper results without changing the structure of the operating and other parts of the machine.

The feeding mechanism 7 can be of any suitable construction and is adapted to feed the bodies successively to the several horns. In the present instance it is composed of a central way 40 and a reciprocating carrier 41, having the fingers 42 for pushing the bodies a certain distance with each stroke, the one nearest the dial delivering the body to the horn.

43 is a cam adapted to engage with the plunger 11 of each horn as it comes opposite the same, the effect being to push the said plunger 11 inside the dial, thereby releasing the movable pieces 10 from their locked position by moving the pivoted members 13 out of the notches 15. This cam can be operated from any suitable point, but is conveniently mounted on the shaft 44, which carries the roll 22 for turning the dial.

The stripping device 8 is preferably of the usual construction, it being composed of two fingers 45, which are caused to reciprocate by means of the rod 46, sliding in the guides 47 and actuated by means of the swinging arm 48, operated from the eccentric 49.

The operation of the device is as follows: The can-bodies are fed singly and successively to the horns, which are now in their collapsed position, as they pass in front of the feeding mechanism. As the dial turns the horns are individually and successively expanded by the plunger 4 and locked in the expanded position while the can-bodies are pushed on the said horns to the proper point. The bodies are then acted upon by the two punches to neck in the said bodies or for the purpose of acting upon them in any desired manner. As the dial turns the horns are brought opposite the cam 43, which releases the horns from the locked position. Finally, the stripping device moves over the horns, pulling off the bodies and simultaneously therewith collapsing the said horns by moving the movable pieces into their foremost position.

Having thus described my invention, what I claim is—

1. In a machine of the character set forth, the combination of a rotatable dial, a plurality of horns carried by the same, means for turning the said dial a space equal to the distance between the centers of two adjacent horns intermittently in one direction only, means for intermittently locking the dial in the position to which it has been turned, a feeding mechanism for feeding can-bodies to the horns, a plunger for pushing the can-bodies in position on the horns, means for acting successively on the can-bodies, and a stripping mechanism for removing the can-bodies from the horns.

2. In a machine of the character set forth, the combination of a rotatable dial, a plurality of horns carried by the same, a feeding mechanism for feeding can-bodies to the horns, a reciprocating slider, a plunger carried by the said slider for pushing the can-bodies in position on the horns, a plurality of punches on the slider for acting successively on the can-bodies, and a stripping mechanism for removing the can-bodies from the horns.

3. In a machine of the character set forth, the combination of a rotatable dial, a plurality of horns carried by the same, means for turning the said dial a space equal to the distance between the centers of two adjacent horns intermittently in one direction only, means for intermittently locking the dial in the position to which it has been turned, a feeding mechanism for feeding can-bodies to the horns, a reciprocating slider, a plunger carried by the said slider for pushing the can-bodies in position on the horns, a plurality of punches on the slider for acting successively on the can-bodies, and a stripping mechanism for removing the can-bodies from the horns.

4. In a machine of the character set forth, the combination of a rotatable dial, a plurality of collapsible and expansible horns carried by the same adapted to support can-bodies, means for turning the said dial a space equal to the distance between the centers of two adjacent horns intermittently in one direction only, means for intermittently locking the dial in the position to which it has been turned, a plunger for pushing the can-bodies in position on the horns and for simultaneously therewith expanding the said horns, means for acting on the said can-bodies, and means for collapsing the said horns and for removing the can-bodies from the same.

5. In a machine of the character set forth, the combination of a rotatable dial, a plurality of collapsible and expansible horns carried by the same adapted to support can-bodies, means for turning the said dial a space equal to the distance between the centers of two adjacent horns intermittently in one direction only, means for intermittently locking the dial in the position to which it has been turned, a plunger for pushing the can-bodies in position on the horns and for simultaneously therewith expanding the said horns and locking them in their expanded position, means for acting on the said can-bodies, and means for releasing the horns from their locked position and for collapsing the said horns and for removing the said can-bodies from the same.

6. In a machine of the character set forth, the combination of a rotatable dial, a plurality of collapsible and expansible horns carried by the same adapted to support can-bodies, a plunger for pushing the can-bodies in position on the horns and for simultaneously therewith expanding the said horns and for locking them in their expanded position, means for acting on the said can-bodies, means for releasing the said horns from their locked position, and means for collapsing them and for removing the can-bodies from the same.

7. In a machine of the character set forth, the combination of a rotatable dial, a plurality of collapsible and expansible horns carried by the same adapted to support can-bodies, a feeding mechanism for feeding can-bodies to the horns, a plunger for pushing the can-bodies in position on the horns and for simultaneously therewith expanding the said horns, means for acting on the said can-bodies, and means for collapsing the said horns and for removing the can-bodies from the same.

8. In a machine of the character set forth, the combination of a rotatable dial, a plurality of collapsible and expansible horns carried by the same adapted to support can-bodies, a feeding mechanism for feeding can-bodies to the horns, means for turning the said dial a space equal to the distance between the centers of two adjacent horns intermittently in one direction only, means for intermittently locking the dial in the position to which it has been turned, a plunger for pushing the can-bodies in position on the horns and for simultaneously therewith expanding the said horns, means for acting on the said can-bodies, and means for collapsing the said horns and for removing the can-bodies from the same.

9. In a machine of the character set forth, the combination of a rotatable dial, a plurality of collapsible and expansible horns carried by the same adapted to support can-bodies, a feeding mechanism for feeding can-bodies to the horns, means for turning the said dial a space equal to the distance between the centers of two adjacent horns intermittently in one direction only, means for intermittently locking the dial in the position to which it has been turned, a plunger for pushing the can-bodies in position on the horns and for simultaneously therewith expanding the said horns and locking them in their expanded position, means for acting on the said can-bodies, means for releasing the horns from their locked position, and means for collapsing the said horns and for removing the said can-bodies from the same.

10. In a machine of the character set forth, the combination of a rotatable dial, a plurality of collapsible and expansible horns carried by the same adapted to support can-bodies, a feeding mechanism for feeding can-bodies to the horns, a plunger for pushing the can-bodies in position on the horns and for simultaneously therewith expanding the said horns and locking them in their expanded position, means for acting on the said can-bodies, means for releasing the said horns from their locked position, and means for collapsing them and for removing the can-bodies from the same.

11. In a machine of the character set forth, the combination of a rotatable dial, a plurality of horns adapted to support can-bodies carried by the said dial, a punch for acting on the said can-bodies, composed of an outer and inner member, a slider carrying said punch adapted to move both members toward and away from the horns, a movable piece on said slider carrying the inner member, a dog on either side of the punch for retarding the retrograde movement of the inner member by engaging with the movable piece, and means for lifting the said dog after the slider has moved back a certain distance.

12. In a machine of the character set forth, a rotatable dial, a horn, attached at its rear end to the front of the said dial, composed of a stationary core portion, longitudinally-movable pieces on said core portion, a plunger in said core portion, and means adapted, when the movable pieces are moved toward the dial to lock the said movable pieces in their rearmost position, and simultaneously therewith to cause the plunger to protrude at the rear of the dial.

13. In a machine of the character set forth, a rotatable dial, a horn, attached at its rear end to the front of the said dial, composed of a stationary tapering core portion, longitudinally-movable wedge-shaped pieces on said core portion, a plunger in said core portion, and means adapted, when the movable pieces are moved toward the dial to lock the said movable pieces in their rearmost position, and simultaneously therewith to cause the plunger to protrude at the rear of the dial.

14. In a machine of the character set forth, a rotatable dial, a horn, attached at its rear end to the front of the said dial, composed of a stationary core portion, longitudinally-movable pieces on said core portion, a plunger in said core portion, a spring acting on said plunger, and pivoted members in said core portion engaging at one end with the plunger to counteract the spring, and adapted when the movable pieces are moved toward the dial to lock the said movable pieces in their rearmost position and simultaneously therewith to allow the spring to cause the plunger to protrude at the rear of the dial.

15. In a machine of the character set forth, a rotatable dial, a horn, attached at its rear end to the front of the said dial, composed of a stationary tapering core portion, longitudinally-movable wedge-shaped pieces on said core portion, a plunger in said core portion, a spring acting on said plunger, and pivoted members in said core portion engaging at one end with the plunger to counteract the spring and adapted when the movable pieces are moved toward the dial to lock the said movable pieces in their rearmost position and simultaneously therewith to allow the spring to cause the plunger to protrude at the rear of the dial.

16. In a machine of the character set forth, a rotatable dial, a horn, attached at its rear end to the front of the said dial, composed of a stationary core portion, longitudinally-movable pieces on said core portion, a plunger in said core portion, means adapted, when the movable pieces are moved toward the dial to lock the said movable pieces in their rearmost position, and simultaneously therewith to cause the plunger to protrude at the rear of the dial, means for moving the movable pieces to their rearmost position, and means for engaging with the protruding plunger to release the movable pieces from their locked position.

17. In a machine of the character set forth, a rotatable dial, a horn, attached at its rear end to the front of the said dial, composed of a stationary tapering core portion, longitudinally-movable wedge-shaped pieces on said core portion, a plunger in said core portion, and means adapted, when the movable pieces are moved toward the dial to lock the said movable pieces in their rearmost position, and simultaneously therewith to cause the plunger to protrude at the rear of the dial, means for moving the movable pieces to their rearmost position, and means for engaging with the protruding plunger to release the movable pieces from their locked position.

18. In a machine of the character set forth, a rotatable dial, a horn, attached at its rear end to the front of the said dial, composed of a stationary core portion, longitudinally-movable pieces on said core portion, a plunger in said core portion, a spring acting on said plunger, pivoted members in said core portion engaging at one end with the plunger to counteract the spring, and adapted when the movable pieces are moved toward the dial to lock the said movable pieces in their rearmost position and simultaneously therewith to allow the spring to cause the plunger to protrude at the rear of the dial, means for moving the movable pieces to their rearmost position, and means for engaging with the protruding plunger to release the movable pieces from their locked position.

19. In a machine of the character set forth, a rotatable dial, a horn, attached at its rear end to the front of the said dial, composed of a stationary tapering core portion, longitudinally-movable wedge-shaped pieces on said core portion, a plunger in said core portion, a spring acting on said plunger, pivoted members in said core portion engaging at one end with the plunger to counteract the spring, and adapted when the movable pieces are moved toward the dial to lock the said movable pieces in their rearmost position and simultaneously therewith to allow the spring to cause the plunger to protrude at the rear of the dial, and means for moving the movable pieces to their rearmost position, and means for engaging with the protruding plunger to release the movable pieces from their locked position.

20. In a machine of the character set forth, a rotatable dial, a horn, normally collapsed, adapted to receive a can-body, attached at its rear end to the front of the said dial, composed of a stationary core portion, longitudinally-movable pieces on said core portion, a plunger in said core portion, and means adapted, when the movable pieces are moved toward the dial to lock the said movable pieces in their rearmost position, and simultaneously therewith to cause the plunger to protrude at the rear of the dial, means for pushing the can-body in position on the horn and for simultaneously therewith moving the movable pieces to their rearmost position thus locking the same in their rearmost position and expanding the horn, means for engaging with the protruding plunger to release the movable pieces from their locked position, and a stripping mechanism for removing the can-body from the horn and for returning the movable pieces to their normal position thus collapsing the horn.

21. In a machine of the character set forth, a rotatable dial, a horn, normally collapsed, adapted to receive a can-body, attached at its rear end to the front of the said dial, composed of a stationary tapering core portion, longitudinally-movable wedge-shaped pieces on said core portion, a plunger in said core portion, and means adapted, when the movable pieces are moved toward the dial to lock the said movable pieces in the rearmost position, and simultaneously therewith to cause the plunger to protrude at the rear of the dial, means for pushing the can-body in position on the horn and simultaneously therewith moving the movable pieces to their rearmost position thus locking the same in their rearmost position and expanding the horn, means for engaging with the protruding plunger to release the movable pieces from their locked position, and a stripping mechanism for removing the can-body from the horn and for returning the movable pieces to their normal position thus collapsing the horn.

22. In a machine of the character set forth, a rotatable dial, a horn, normally collapsed, adapted to receive a can-body, attached at its rear end to the front of the said dial, composed of a stationary core portion, longitudinally-movable pieces on said core portion, a plunger in said core portion, a spring acting on said plunger, pivoted members in said core portion engaging at one end with the plunger, to counteract the spring, and adapted when the movable pieces are moved toward the dial to lock the said movable pieces in their rearmost position and simultaneously therewith to allow the spring to cause the plunger to protrude at the rear of the dial, means for pushing the can-body in position on the horn and simultaneously therewith moving the movable pieces to their rearmost position thus locking the same in their rearmost position and expanding the horn, means for engaging with the protruding plunger to release the movable pieces from their locked position, and a stripping mechanism for removing the can-body from the horn and for returning the movable pieces to their normal position thus collapsing the horn.

23. In a machine of the character set forth, a rotatable dial, a horn, normally collapsed, adapted to receive a can-body, attached at its rear end to the front of the said dial, composed of a stationary tapering core portion, longitudinally-movable wedge-shaped pieces on said core portion, a plunger in said core portion, a spring acting on said plunger, pivoted members in said core portion engaging at one end with the plunger to counteract the spring, and adapted when the movable pieces are moved toward the dial to lock the said movable pieces in their rearmost position, and simultaneously therewith to allow the spring to cause the plunger to protrude at the rear of the dial, means for pushing the can-body in position on the horn and simultaneously therewith moving the movable pieces to their rearmost position thus locking the same in their rearmost position and expanding the horn, means for engaging with the protruding plunger to release the movable pieces from their locked position, and a stripping mechanism for removing the can-body from the horn and for returning the movable pieces to their normal position thus collapsing the horn.

24. In a machine of the character set forth, a rotatable dial, notches in said dial, a pivoted lever, an arm carried by said pivoted lever, a rod connected with said arm, a roll on either side of said rod, a shaft extending at right angles to the rod, and two cams carried by the said shaft adapted to engage with the rolls to move the rod in opposite directions to cause the pivoted lever to engage and disengage with the said notches.

25. In a machine of the character set forth, a rotatable dial, a horn, attached at its rear end to the front of the said dial, composed of a stationary core portion, longitudinally-movable pieces on said core portion, a plunger in said core portion, means adapted, when the movable pieces are moved toward the dial to lock the said movable pieces in their rearmost position, and simultaneously therewith to cause the plunger to protrude at the rear of the dial, and a spring-detent on the core portion extending over one of the movable pieces.

26. In a machine of the character set forth, a rotatable dial, a horn, attached at its rear end to the front of the said dial, composed of a stationary tapering core portion, longitudinally-movable wedge-shaped pieces on said core portion, a plunger in said core portion, means adapted, when the movable pieces are moved toward the dial to lock the said movable pieces in their rearmost position, and simultaneously therewith to cause the plunger to protrude at the rear of the dial, and a spring-detent on the core portion extending over one of the movable pieces.

Signed at New York city this 24th day of June, 1903.

HERBERT H. HULL.

Witnesses:
ANNIE WISSEMANN,
CHARLES LA C. HOFF.